(12) United States Patent
Yu

(10) Patent No.: US 11,469,602 B2
(45) Date of Patent: Oct. 11, 2022

(54) CONTROL CIRCUIT MODULE AND CONTROL METHOD THEREOF

(71) Applicant: Getac Technology Corporation, Hsinchu County (TW)

(72) Inventor: Wen-huan Yu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 365 days.

(21) Appl. No.: 16/031,100

(22) Filed: Jul. 10, 2018

(65) Prior Publication Data

US 2019/0181667 A1  Jun. 13, 2019

(30) Foreign Application Priority Data

Dec. 8, 2017 (CN) .......................... 201711293182.6

(51) Int. Cl.
*H02J 7/00* (2006.01)
*H01M 10/42* (2006.01)

(52) U.S. Cl.
CPC ....... *H02J 7/0031* (2013.01); *H01M 10/4257* (2013.01); *H01M 2010/4271* (2013.01); *H02J 7/00306* (2020.01)

(58) Field of Classification Search
CPC .... H02J 7/0029; H02J 7/0063; H02J 7/00306; H02J 7/0031; H01M 10/4257; H01M 2010/4271

USPC ......................................................... 320/135
See application file for complete search history.

(56) References Cited

U.S. PATENT DOCUMENTS

| 2010/0207586 A1* | 8/2010 | Kim .................. | H01M 10/4257 320/136 |
| 2015/0108951 A1* | 4/2015 | Yamaguchi et al. .. | H02J 7/0029 |
| 2018/0041054 A1* | 2/2018 | Nakamoto ............ | H02J 7/1492 |
| 2018/0262023 A1* | 9/2018 | Li ........................ | H02J 7/0019 |

FOREIGN PATENT DOCUMENTS

| CN | 203398236 U | 1/2014 |
| CN | 104753145 A | 7/2015 |

OTHER PUBLICATIONS

China Patent Office, "Office Action", dated Jun. 27, 2022, China.

* cited by examiner

*Primary Examiner* — Zixuan Zhou
(74) *Attorney, Agent, or Firm* — Locke Lord LLP; Tim Tingkang Xia, Esq.

(57) ABSTRACT

A control circuit module and a control method thereof are provided. The method includes enabling a first discharge circuit by a controller, instructing a first battery cell of a battery module to operate in a ship mode, and disabling the first discharge circuit.

10 Claims, 3 Drawing Sheets

CONTROL CIRCUIT MODULE AND CONTROL METHOD THEREOF

RELATED APPLICATIONS

This application claims priority to Chinese application serial number 201711293182.6, filed Dec. 8, 2017, which is herein incorporated by reference.

BACKGROUND OF THE INVENTION

Field of the Invention

The present invention relates to a control circuit module and a control method thereof.

Description of the Prior Art

In general, electronic devices each comprise a battery. The batteries supply power required for operation of electronic devices. Electronic device users nowadays may not only carry the electronic devices everywhere regardless of whether electrical outlets are accessible, but may also keep using the electronic devices conveniently by charging the batteries which have run out of power. By contrast, it is inconvenient for electronic device manufacturers to test batteries in the course of a manufacturing process thereof, because battery configuration must be performed independently with the other machines, but not be performed by operating the electronic devices.

Upon completion of the manufacturing process, if an electronic device and a battery mounted therein are delivered together, the battery cannot enter a ship mode again. If the battery as well as parts and components of the electronic device are separately delivered, delivery costs will increase. Current aviation and transportation laws stipulate that the remaining power level of high-capacity batteries, such as batteries with capacity higher than 100 Wh, shall be lower than 20% throughout a transportation process. However, after being transported for a long period of time, batteries with a low power level undergo overdischarge and thus are likely to get damaged. Therefore, if an electronic device and a low-power battery mounted therein are transported or stored together, the battery will discharge slowly. Furthermore, the battery cannot enter the ship mode again easily in order to be configured through an electronic device.

SUMMARY OF THE INVENTION

In view of the aforesaid drawbacks of the prior art, it is an objective of the present invention to provide a control circuit module and a control method thereof.

In an embodiment, a control circuit module applicable to a system circuit of an electronic device comprises a first check circuit, a first discharge circuit and a controller. The first check circuit is coupled between the system circuit and a positive electrode of a first battery cell. The first discharge circuit is coupled between a first node and a ground, with the first node coupled to the positive electrode of the first battery cell and the first check circuit. The first discharge circuit has a first discharge control end. The controller is coupled to the system circuit and adapted to control the first discharge control end and the first battery cell.

In an embodiment, a control method of a control circuit module comprises the steps of: enabling a first discharge circuit by a controller; causing a first battery cell of a battery module to enter a ship mode; and disabling the first discharge circuit by the controller. A positive electrode of the first battery cell is coupled to a first node, with the first node coupled to the first discharge circuit and a first check circuit.

In conclusion, a control circuit module and a control method thereof according to an embodiment of the present invention has advantages as follows: with a battery module being configured through a controller, a designer of the control circuit module does not need to use any other machine to configure the battery module; the battery module is delivered together with a portable electronic device; a leakage current does not prevent the battery module from entering a ship mode again; and the battery module smoothly enters and stays in the ship mode and thus never overdischarges even when stored for a long period of time.

DETAILED DESCRIPTION OF THE EMBODIMENTS

Figure 1:
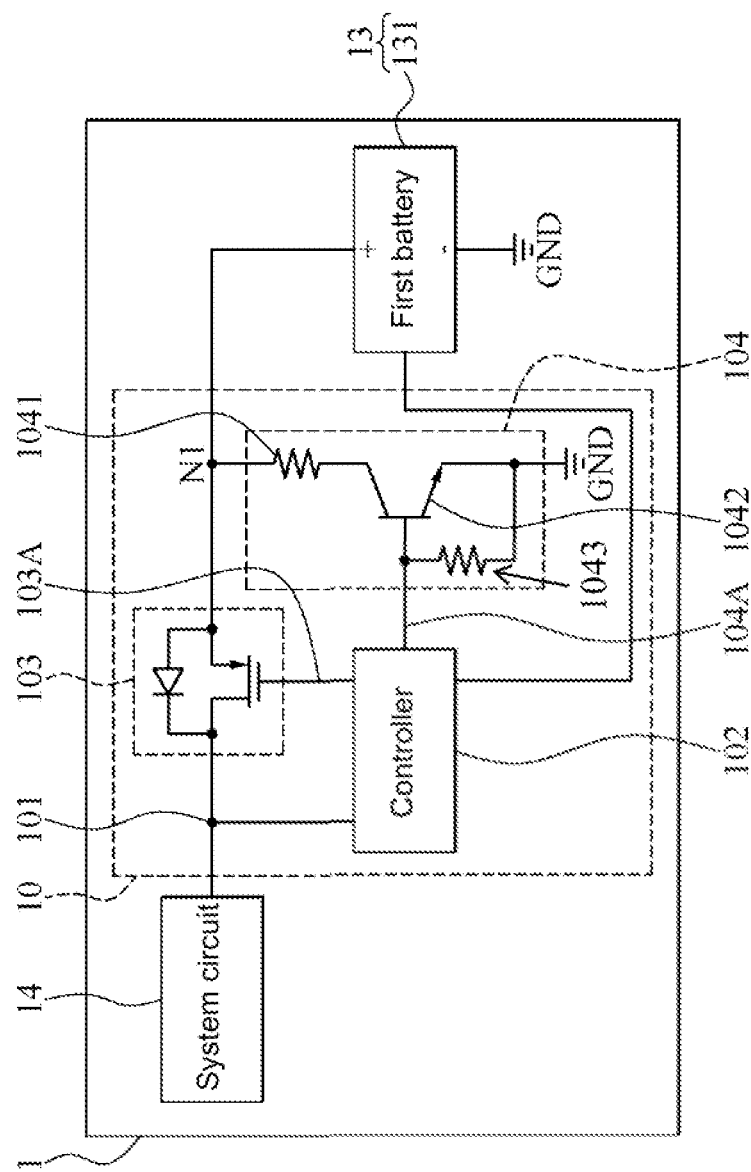
FIG. 1 is a schematic view of a portable electronic device according to an embodiment of the present invention.

FIG. 1 is a schematic view of a portable electronic device according to an embodiment of the present invention. The portable electronic device 1 comprises a control circuit module 10, a battery module 13 and a system circuit 14. The control circuit module 10 is coupled to the system circuit 14 and the battery module 13. The system circuit 14 generates a charging current, using an external power source of the portable electronic device 1. The control circuit module 10 comprises a power input/output end 101. The charging current is transferred to the battery module 13 through the system circuit 14 and the power input/output end 101 of the control circuit module 10 such that the battery module 13 is charged according to the charging current. In an embodiment, the power input/output end 101 is deemed a general power channel of the portable electronic device 1.

The control circuit module 10 further comprises a first check circuit 103, a first discharge circuit 104 and a controller 102. The battery module 13 comprises a first battery 131. The first battery 131 has a positive electrode and a negative electrode. The positive electrode of the first battery 131 is coupled to the first discharge circuit 104 and the first check circuit 103. The negative electrode of the first battery 131 is coupled to a ground GND. The first discharge circuit 104 is coupled between the positive electrode of the first battery 131 and the ground GND. The first check circuit 103 is coupled between the positive electrode of the first battery 131 and the system circuit 14. The first discharge circuit 104 has a discharge control end (hereinafter referred to as the first discharge control end 104A.) The controller 102 is coupled to the first discharge control end 104A.

The first check circuit 103 provides a non-return flow function. In the course of the operation of the portable electronic device 1, the non-return flow function of the first check circuit 103 prevents an instantaneously generated large current from being transferred from the outside of the control circuit module 10 or the system circuit 14 to the inside of the control circuit module 10 through the power input/output end 101 to therefore damage the battery module 13. A power-supplying current supplied by the battery module 13 passes through the first check circuit 103, and then the power-supplying current is transferred from the battery module 13 to the system circuit 14 through the power input/output end 101, so as to supply power to the portable electronic device 1.

The first discharge circuit 104 provides a discharge function. In the course of the operation of the portable electronic device 1, the controller 102 enables the discharge function of the first discharge circuit 104. If a leakage current generated inside the portable electronic device 1 (that is, the outside of the control circuit module 10) is admitted to the power input/output end 101 and passes through the first check circuit 103, the first discharge circuit 104 will release the leakage current passing through the first check circuit 103 to the ground GND to prevent the positive electrode of the first battery 131 from receiving the leakage current and not entering a ship mode again.

Figure 2:
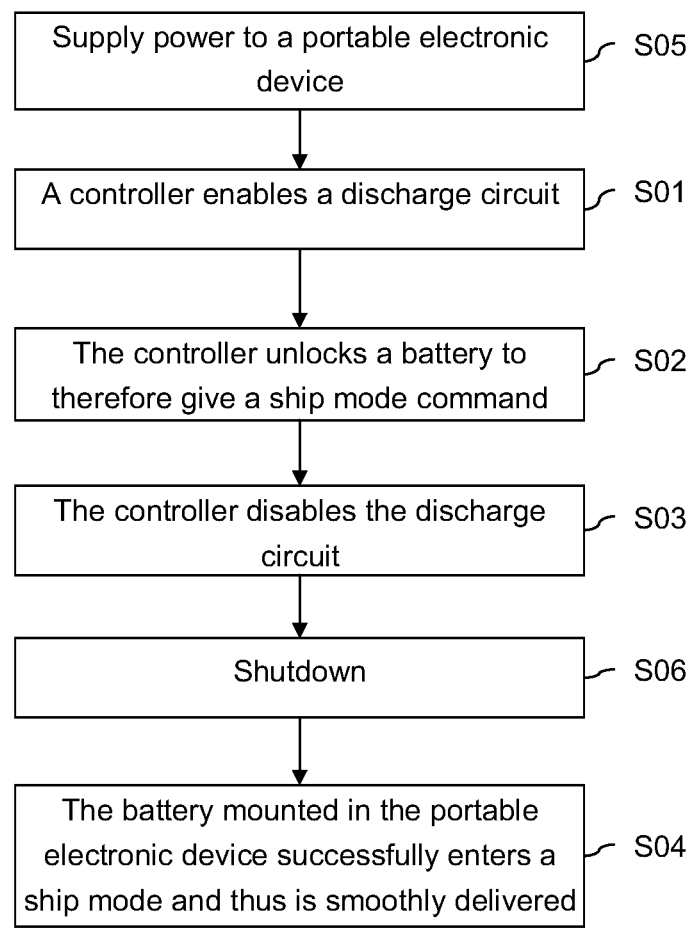
FIG. 2 is a flowchart of a control method of a control circuit module of FIG. 1.

FIG. 2 is a flowchart of a control method of the control circuit module 10 of FIG. 1. Referring to FIG. 1 and FIG. 2, to begin a configuration process, the controller 102 enables the first discharge circuit 104 (step S01), then the controller 102 causes the first battery 131 to stop supplying a power-supplying current (step S02), and finally the controller 102 instructs the first battery 131 to enter the ship mode. After the first battery 131 has stopped supplying the power-supplying current, the first discharge circuit 104 is still ON and thus is electrically connected to the ground GND to therefore release the leakage current passing through the first check circuit 103 to the ground GND, and eventually the controller 102 disables the first discharge circuit 104 (step S03). The portable electronic device 1 and the battery module 13 mounted therein are delivered together (step S04). The manufacturer of the portable electronic device 1 configures the battery module 13 through the controller 102 of the portable electronic device 1.

Figure 3:
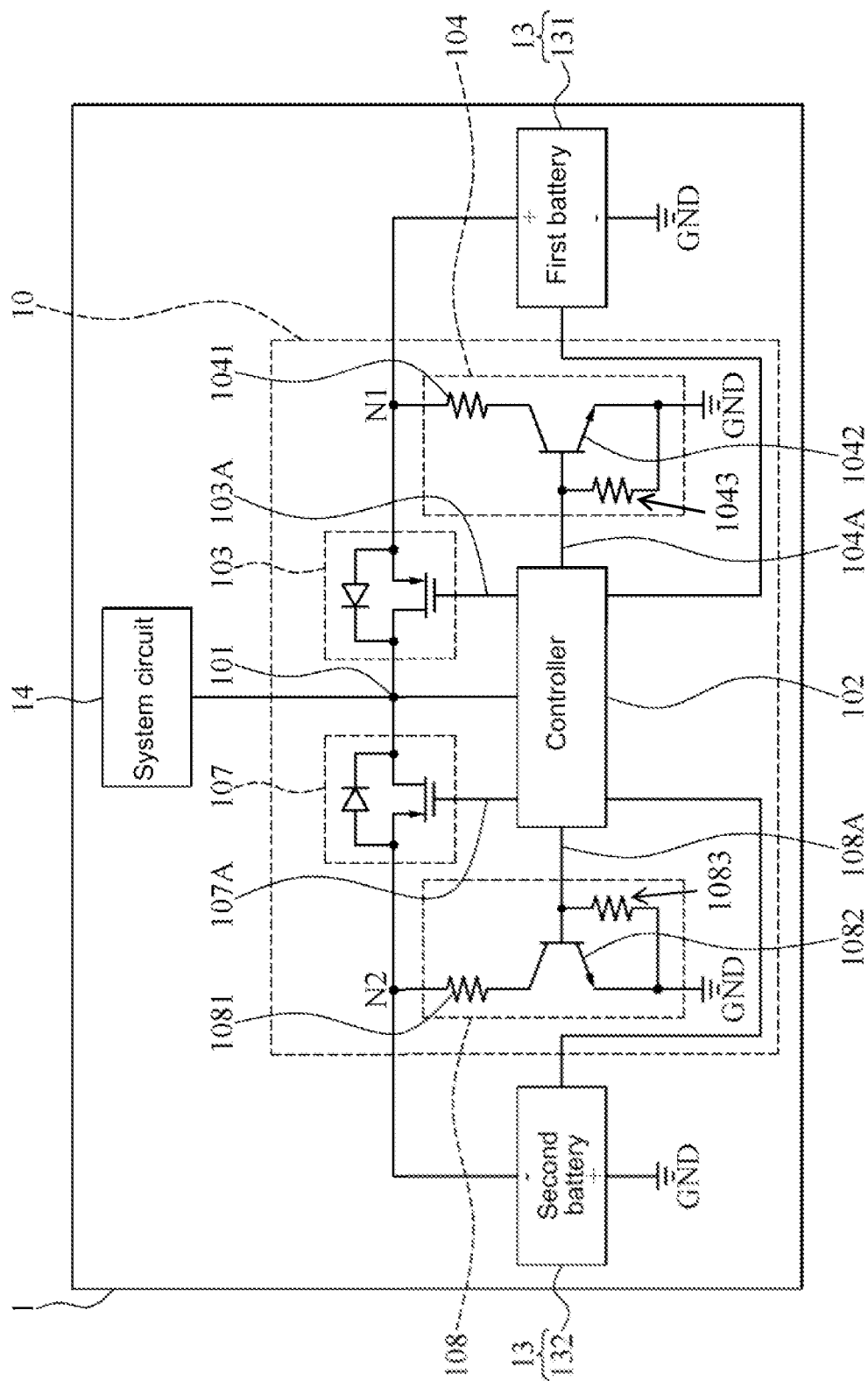
FIG. 3 is a schematic view of the portable electronic device according to another embodiment of the present invention.

Referring to FIG. 3, there is shown a schematic view of the portable electronic device according to another embodiment of the present invention. As shown in the diagram, the battery module 13 further comprises a second battery 132, whereas the control circuit module 10 further comprises a second discharge circuit 108 and a second check circuit 107. The second battery 132 has the positive electrode and the negative electrode. The positive electrode of the second battery 132 is coupled to the second discharge circuit 108 and the second check circuit 107. The negative electrode of the second battery 132 is coupled to the ground GND. The second discharge circuit 108 is coupled between the positive electrode of the second battery 132 and the ground GND. The second check circuit 107 is coupled between the positive electrode of the second battery 132 and the power input/output end 101. In this embodiment, the battery module 13 not only features charging and discharging the first battery 131 and the second battery 132 recurrently but also uses two back-to-back field-effect transistors to implement reverse current blocking and thereby prevent the current from advancing reversely under a reverse bias voltage, wherein the first check circuit 103 and the second check circuit 107 together form a structure of two back-to-back field-effect transistors. The second discharge circuit 108 has a discharge control end (hereinafter referred to as the second discharge control end 108A.) The controller 102 is coupled to a second check control end 107A and the second discharge control end 108A.

Similarly, the second check circuit 107 provides a non-return flow function. In the course of the operation of the portable electronic device 1, the non-return flow function of the second check circuit 107 prevents an instantaneously generated large current from being transferred from the outside of the control circuit module 10 to the battery module 13 through the power input/output end 101 to therefore damage the second battery 132. Furthermore, the power-supplying current supplied by the second battery 132 leaves the battery module 13, passes through the second check circuit 107, and exits the power input/output end 101.

The second discharge circuit 108 provides a discharge function. In the course of the operation of the portable electronic device 1, the controller 102 enables the discharge function of the second discharge circuit 108. If the leakage current generated inside the portable electronic device 1 is admitted to the power input/output end 101 and passes through the second check circuit 107 while the leakage current from the first battery 131 passes through the second check circuit 107, the second discharge circuit 108 will release the leakage current passing through the second check circuit 107 to the ground GND to prevent the positive electrode of the second battery 132 from receiving the leakage current which originates from the power input/output end 101 and the leakage current which originates from the first battery 131 and not entering the ship mode again.

After the controller 102 has disabled the first discharge circuit 104 (step S03), the controller 102 starts with step S01 again and executes step S01 through step S03 repeatedly. The controller 102 enables the second discharge circuit 108 (step S01). Then, the controller 102 instructs the second battery 132 to enter the ship mode (step S02). After the second battery 132 has entered the ship mode, the controller 102 disables the second discharge circuit 108 (step S03). After entering the ship mode, the first battery 131 and the second battery 132 are not susceptible to the leakage current.

In the aforesaid embodiment, the controller 102 enables the first discharge circuit 104 (step S01) such that the first discharge circuit 104 releases the leakage current generated from the second battery 132 and passing through the first check circuit 103 to the ground GND. Hence, before entering the ship mode, the first battery 131 is not affected by the leakage current which originates from the system circuit 14 or the second battery 132. Afterward, the first battery 131 and the second battery 132 enter the ship mode successfully when instructed to do so by the controller 102.

In an embodiment, the first discharge circuit 104 comprises a first resistor 1041, a second resistor 1043 and a switch transistor 1042. The first resistor 1042 and the switch transistor 1042 are connected in series between the first node N1 and the ground. The switch transistor 1042 has a control end, which functions as the first discharge control end 104A of the first discharge circuit 104. The second resistor 1043 is connected between the first discharge control end 104A and the ground. The second discharge circuit 108 comprises a third resistor 1081, a fourth resistor 1083 and a switch transistor 1082. The third resistor 1082 and the switch transistor 1082 are connected in series between the second node N2 and the ground. The switch transistor 1082 has a control end, which functions as the second discharge control end 108A of the second discharge circuit 108. The fourth resistor 1083 is connected between the second discharge control end 108A and the ground. In step S02, the controller 102 not only causes the switch transistor 1042 to turn on and thus enables the first discharge circuit 104, but also causes the switch transistor 1082 to turn on and thus enables the second discharge circuit 108. After the switch transistor 1042 and the switch transistor 1082 have turned on, the first resistor 1041 and the third resistor 1081 form a grounded resistor such that discharge takes place from a first node N1 and a second node N2 to the ground GND through the first resistor 1041 and the third resistor 1081 so as to release the leakage current which exists in the first check circuit 103 and beside the first battery 131 as well as in the second check circuit 107 and beside the second battery 132.

In an embodiment, the controller 102 enables the first discharge circuit 104 (step S01) to ensure that the leakage current which exists in the first check circuit 103 and beside the first battery 131 will be released to the ground GND. At this point in time, the controller 102 gives a ship mode command to the first battery 131. It is only when the first battery 131 enters the ship mode that the controller 102 starts to disable the first discharge circuit 104. Likewise, the controller 102 enables the second discharge circuit 108 (step S01) to ensure that the leakage current which exists in the second check circuit 107 and beside the second battery 132 will be released to the ground GND. At this point in time, the controller 102 gives the ship mode command to the second battery 132. It is only when the second battery 132 enters the ship mode that the controller 102 starts to disable the second discharge circuit 108.

In an embodiment, the controller 102 is an embedded controller (EC). A designer of the portable electronic device 1 compiles firmware code for controlling the execution of steps S01-S03 by the controller 102, so as to configure the control circuit module 10.

In an embodiment, in step S02, after enabling the first discharge circuit 104 and the second discharge circuit 108 simultaneously, the controller 102 instructs the first battery 131 and the second battery 132 to enter the ship mode. After the first battery 131 and the second battery 132 have entered the ship mode, the first battery 131 and the second battery 132 consume little power while the portable electronic device 1 is shut down. If the portable electronic device 1 is shut down for a long period of time, the first battery 131 and the second battery 132 will not overdischarge. For instance, if a battery operating in the ship mode consumes 500 nA power, then a fully-charged battery with a capacity of 100 mAh will still have 90% thereof at the end of a two years' storage period. Even though current aviation and transportation laws stipulate that the remaining power level of batteries shall be lower than 20% throughout a transportation process, batteries with a low power level do not overdischarge after being transported for a long period of time.

The battery module 13 further comprises a management chip. The management chip is coupled to the first and second batteries 131, 132 such that the management chip can lock the first and second batteries 131, 132 to prevent the first and second batteries 131, 132 from accepting a change command. In step S02, to cause the first battery 131 to enter the ship mode, the controller 102 unlocks the first battery 131 through the management chip and then the controller 102 sends a control signal or command to the management chip after the first battery 131 has been unlocked, thereby allowing the management chip to cause the first battery 131 to enter the ship mode. Likewise, to cause the second battery 132 to enter the ship mode, the controller 102 unlocks the second battery 132 through the management chip and then the controller 102 sends another control signal to the management chip after the second battery 132 has been unlocked, thereby allowing the management chip to cause the second battery 132 to enter the ship mode.

The management chip in single said first battery 131 or the battery module 13 allows single said first battery 131 or the battery module 13 to enter the ship mode. In general, the management chip is locked after completion of configuration but before delivery and thus prevented from accepting a command of changing configuration. The battery module 13 must be returned to the original manufacturer to undergo configuration anew in order to enter the ship mode. Before mounting the battery module 13 in the portable electronic device 1, it is necessary to test charging and discharging functions of the battery module 13. Once charging happens, it is necessary to wake up the battery module 13, or in other words, cause it to exit the ship mode.

Considering that the battery module 13 is to be mounted in the portable electronic device 1 and then delivered together therewith, it is feasible for the controller 102 (which is an embedded controller in this embodiment) in the portable electronic device 1 to give a command to the battery module 13 such that it reenters the ship mode. However, the leakage current or a residual voltage of the portable electronic device 1 affects the ship mode command to be received by the battery module 13. Therefore, the battery module 13 cannot enter the ship mode in the presence of the residual voltage or the leakage current.

Since it is necessary to prevent the battery module 13 or the first battery 131 from causing the portable electronic device 1 to shut down compulsorily upon receipt of the ship mode command, or in other words, upon entry into the ship mode, it is necessary that, before its delivery, the portable electronic device 1 which at least one said first battery 131 is mounted therein must be connected to an external power source, such as a power supply, for supplying power to the portable electronic device 1 (step S05). In this embodiment, after obtaining 19V voltage from the power supply, the portable electronic device 1 transforms the 19V voltage into 3V voltage and then supplies power to the embedded controller to allow the embedded controller to obtain a power source other than the battery module 13, thereby using the embedded controller to unlock the management chip and give a command.

In this embodiment, the first check circuit 103 comprises a non-ideal diode and thus has the residual voltage or the leakage current. If a command is issued to the management chip in the battery module 13 to instruct it to enter the ship mode, the residual voltage or the leakage current will stop the first battery 131 from entering the ship mode. Hence, before the embedded controller gives a command to the battery module 13, it is necessary to enable the first discharge circuit 104 in order to ensure that the residual voltage or the leakage current will not affect the first battery 131, then unlock the first battery 131 through an SMBus or I2C bus in order to give the command such that it enters the ship mode, and disable the first discharge circuit 104; at this point in time, since the first battery 131 has entered the ship mode, it is no longer easily affected by the residual voltage or the leakage current. Finally, this embodiment involves shutting down the portable electronic device 1 and removing the external power source (i.e., a power supply in this embodiment). Therefore, the battery module 13 mounted in the portable electronic device 1 can enter the ship mode smoothly and certainly.

In conclusion, a control circuit module and a control method thereof according to an embodiment of the present invention has advantages as follows: a controller applicable to a portable electronic device assists a battery module which fails to sense a residual voltage or a leakage current in entering a ship mode; with the battery module being configured through the controller, a designer of the control circuit module does not need to use any other machine to configure the battery module or return it to an original manufacturer to undergo configuration anew; the battery module is delivered together with the portable electronic device; a leakage current does not prevent the battery module from entering the ship mode again; and the battery module stays in the ship mode and thus never overdischarges even when stored for a long period of time.

Although the present invention is disclosed above by embodiments, the embodiments are not restrictive of the present invention. Changes and modifications can be made to the embodiments by persons skilled in the art without departing from the spirit and scope of the present invention. Accordingly, the legal protection for the present invention should be defined by the appended claims.

What is claimed is:

1. A control circuit module, applicable to a system circuit of an electronic device, the control circuit module comprising:
    a first check circuit coupled between the system circuit and a positive electrode of a first battery cell;
    a second check circuit coupled between the system circuit and a positive electrode of a second battery cell;
    a first discharge circuit coupled between a first node and a ground, with the first node coupled to the positive electrode of the first battery cell and the first check circuit, wherein the first discharge circuit has a first discharge control end, the first discharge circuit comprises a first resistor, a second resistor and a first switch, the first resistor and the first switch are connected in series between the first node and the ground, the first discharge control end is a control end of the first switch, and the second resistor is connected between the first discharge control end and the ground;
    a controller coupled to the system circuit and adapted to control the first discharge control end and the first battery cell;
    a second discharge circuit coupled between a second node and the ground, with the second node coupled to the positive electrode of the second battery cell and the second check circuit, wherein the second discharge circuit has a second discharge control end, and the controller controls the second discharge control end and the second battery cell; and
    a power input/output end, wherein a charging current is transferred to the first battery cell through the system circuit and the power input/output end such that the first battery cell is charged according to the charging current,
    wherein the power input/output end is coupled between the system circuit and the controller, and the power input/output end couples the system circuit to the controller.

2. The control circuit module of claim 1, wherein the second discharge circuit comprises a third resistor, a fourth resistor and a second switch, the third resistor and the second switch are connected in series between the second node and the ground, the second discharge control end is a control end of the second switch, and the fourth resistor is connected between the second discharge control end and the ground.

3. The control circuit module of claim 1, wherein the controller couples the power input/output end to the first battery cell.

4. The control circuit module of claim 1, wherein the controller couples the power input/output end to the first discharge circuit.

5. A control method of a control circuit module, applicable to an electronic device, the control method comprising the steps of:
    enabling a first discharge circuit by a controller;
    enabling a second discharge circuit by the controller;
    causing a first battery cell of a battery module to enter a ship mode, wherein a positive electrode of the first battery cell is coupled to a first node, with the first node coupled to the first discharge circuit and a first check circuit;
    causing a second battery cell of the battery module to enter the ship mode, wherein a positive electrode of the second battery cell is coupled to a second node, with the second node coupled to the second discharge circuit and a second check circuit disabling the first discharge circuit by the controller; and
    disabling the second discharge circuit by the controller;
    wherein the first discharge circuit transfers a current from a system circuit of the electronic device and the first check circuit to a ground, receives a first leakage current generated from the system circuit and admitted to a power input/output end and passing through the first check circuit, and transfers the first leakage current to the ground;
    wherein the first discharge circuit comprises a first resistor, a second resistor and a first switch, the first resistor and the first switch are connected in series between the first node and the ground, the first discharge control end is a control end of the first switch, and the second resistor is connected between the first discharge control end and the ground;
    wherein the power input/output end is coupled between the system circuit and the controller, and the power input/output end couples the system circuit to the controller.

6. The control method of the control circuit module according to claim 5, wherein the step of causing the first battery cell and the second battery cell to enter the ship mode comprises:
    unlocking a management chip of the battery module; and
    causing by the management chip the first battery cell and the second battery cell to enter the ship mode.

7. The control method of the control circuit module according to claim 5, wherein the second discharge circuit transfers a current from the system circuit and the second check circuit to the ground, receives a second leakage current generated from the system circuit and passing through the second check circuit, and transfers the second leakage current to the ground.

8. The control method of the control circuit module according to claim 5, wherein the controller couples the power input/output end to the first battery cell.

9. The control method of the control circuit module according to claim 5, wherein the controller couples the power input/output end to the first discharge circuit.

10. The control method of the control circuit module according to claim 5, wherein the second discharge circuit comprises a third resistor, a fourth resistor and a second switch, the third resistor and the second switch are connected in series between the second node and the ground, the second discharge control end is a control end of the second switch, and the fourth resistor is connected between the second discharge control end and the ground.

* * * * *